Patented June 21, 1927.

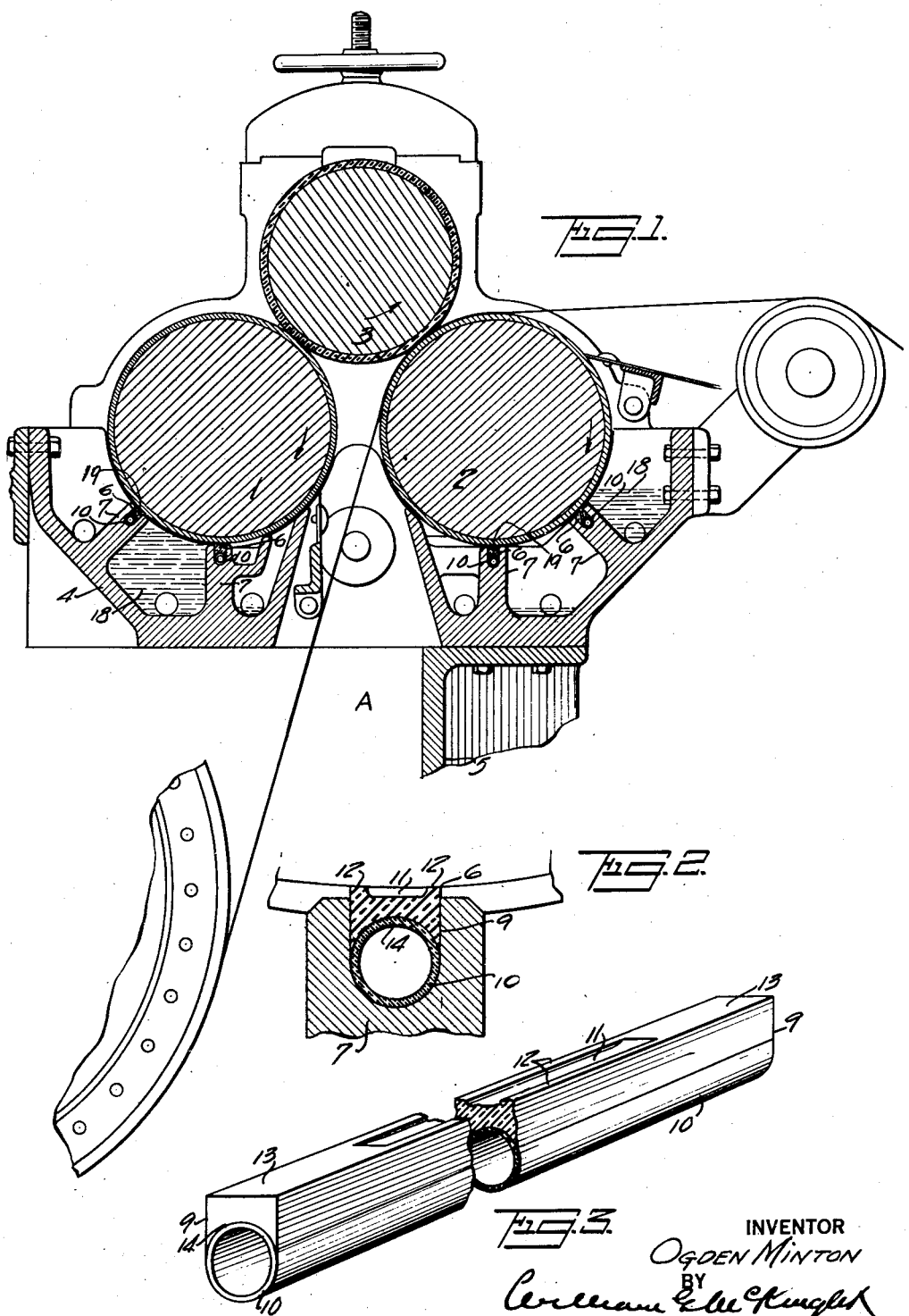

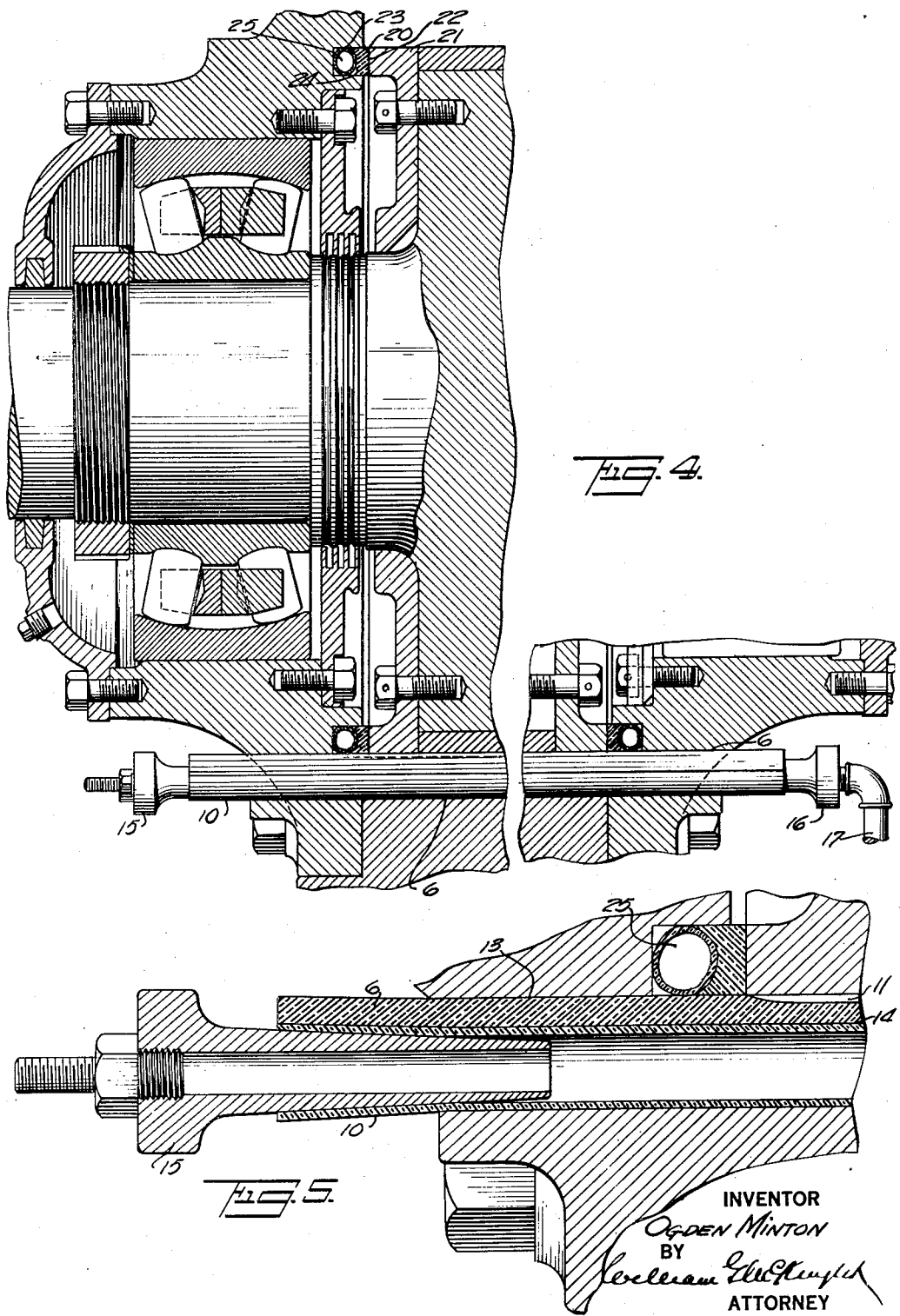

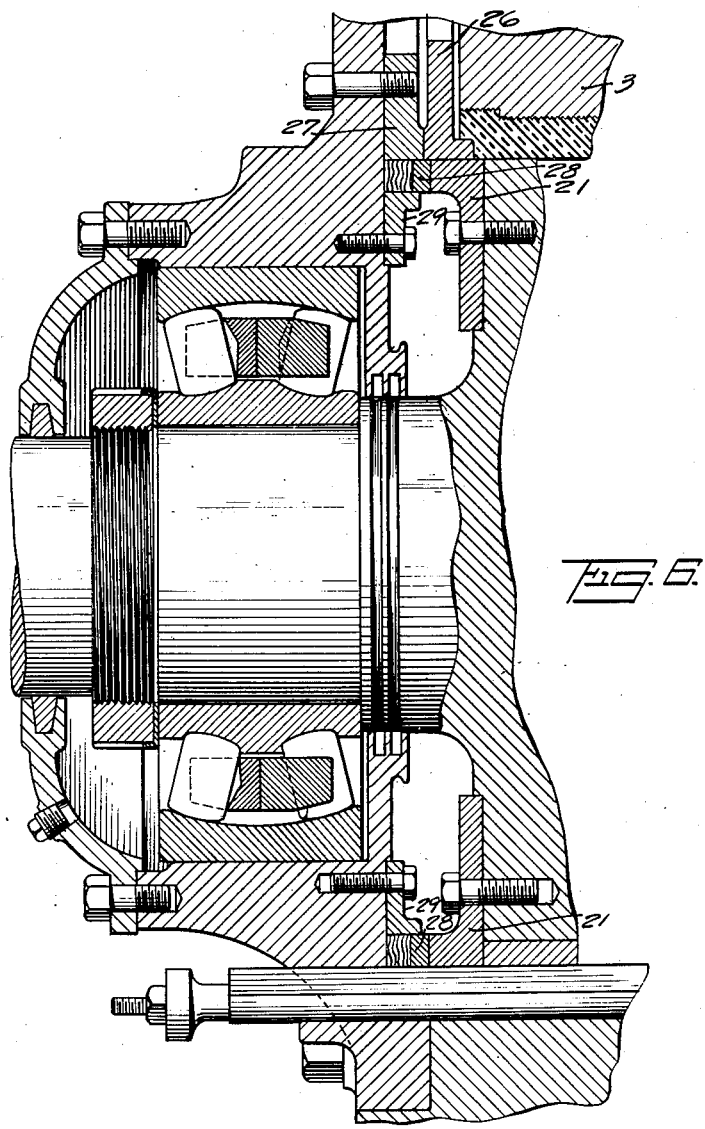

1,633,121

UNITED STATES PATENT OFFICE.

OGDEN MINTON, OF GREENWICH, CONNECTICUT.

VACUUM SEAL AND APPARATUS.

Application filed March 26, 1926. Serial No. 97,592.

My invention relates to sealing means for vacuum drying apparatus such as that shown in my application Serial Number 646,693, filed June 20th, 1923.

It is my object to provide an improved adjustable packing for bearing upon the surface of the rotating members, as well as improved bearing surfaces for sliding engagement between the ends of such rotating members and the walls of the vacuum chamber.

In the accompanying drawings the same reference numerals refer to similar parts in the several figures.

Fig. 1 is a vertical section of a seal guarding an exit passage of the chamber, and provided with my improved adjustable packing;

Fig. 2 is a vertical section, on an enlarged scale, of the packing;

Fig. 3 is a perspective view of the packing;

Fig. 4 is a view partly in section showing the ends of a rotating member, and my improved bearing surfaces;

Fig. 5 is a sectional view of my adjustable packing and the manner of mounting it in the casing;

Fig. 6 is a sectional view showing the ends of a rotating member and another form of my improved bearing surfaces.

To seal the entrance and exit passages of the vacuum chamber against the admission of air, I employ three rolls, 1, 2, and 3, mounted to rotate in the frame of the seal, which frame is secured to, and a part of the casing 5 forming the vacuum chamber A. Rolls 1 and 2 are brass covered. Roll 3, which is provided with a yielding surface, preferably rubber, is wholly or partially supported by the brass rolls 1 and 2. In slots 6, provided in the members 7 of the casing 4, I locate my improved adjustable packing or wiper, consisting of the member 9 and the tube 10. The upper surface of the member 9 is provided with the depression 11, forming the narrow longitudinal ribs 12, which constitute the bearing surfaces for engagement with the rotating members 1 and 2. At the ends of the depression are the flat surfaces 13 for close contact with the end frame 5 of the casing. The lower surface of the member 9 is provided with a semi-circular depression 14 for reception of the tube 10. This construction of the member 9 provides a three point support, comprising the two ribs 12 and the dome of the tube, as at 14 in Fig. 2. This construction prevents the member 9 from tending to upset and twist in the slots.

To receive the adjustable wipes or packing, slots 6 are provided and the packing 9 is given sufficient length so that its ends protrude from either side of the frame. This construction permits of easy insertion and removal of the packing. When in place in the slot 6, the tube 10 is closed at one end with the plug 15, the other end being provided with a plug 16 into which is fitted the pipe 17, for admission of any suitable fluid into tube 10. The pipe 17 is provided with any suitable valve (not shown) whereby the amount of fluid entering the tube 10 may be regulated, and so the member 9 may be adjusted to bear against the surface of the rolls with any degree of force. The flat surfaces 13 of the member 9 contact with the roof of the slot 6 and produce an air and water tight joint, (Fig. 5).

The liquid seal 18 is employed to prevent the admission of air between the periphery of the rolls 1 and 2 and the frame 4 of the seal. Free passage of the liquid into the chamber is prevented by the packing or wiper 9, and the passage between the surface of the roll and the packing may be restricted to any degree by amount of fluid admitted to the tube 10.

I employ the same form of packing at 19, but in this case the member 9 is adjusted to bear with greater force upon the surface of the roll, and the member 9 then acts as a wiper to remove the liquid from, and dry the surface of the roll.

I will now describe my improved bearing surfaces for the ends of the rolls and the frame. Referring to Fig. 4, the corner 20 of the roll must be very sharp to prevent air leaking into the chamber. Handling of the rolls may cause breakage of this corner, necessitating replacement of such damaged roll. To guard against such contingency, I provide the end of the roll with a ring 21, having an end bearing surface 22. This ring may be bolted to the roll, and should it become damaged, another may replace it, without discarding the entire roll. In a groove 23 of the frame is located the bronze ring 24, held out against the ring face 22, by the rubber tube 25. I may use a piece of solid rubber, or sponge rubber, or any other resilient material, for this purpose.

In Fig. 6, I illustrate another way of providing bearing surfaces for the ends of the rolls. The rubber covered roll 3 is provided with an end ring 26, which bears against the ring 27, bolted to the frame. The end ring 21 of the bronze roll bears against the ring 28, held in place between the ring 29, bolted to the frame, and the ring 27. The ring 28 is held out toward ring 21 by the resilient strip which may be sponge rubber or other suitable yielding material.

The ends of the rolls, turning at high speed against the frame cause considerable wear. In the present form of construction only the removable bearing surfaces need be replaced in case of wear, thus avoiding the replacement of an entire roll or end frame of the casing.

It will be understood that I provide any suitable liquid to lubricate the engaging end surfaces of rolls and frame, and thus seal the ends of the rolls against the admission of air into the vacuum chamber.

What I claim is:

1. A packing or wiper comprising a contact member, the upper surface of which is provided with a depression bounded on the sides by flat portions for contact with the face of a rotating member, and on the ends with other flat portions for contact with the roof of a slot in the frame, the under surface of said contact member being provided with a semi-circular opening to receive a tube, and fluid means to press said contact member into contact with the rotating member.

2. A packing or wiper comprising a contact member having two longitudinal edge portions for contact with a roll and fluid means to press said contact member into contact with the roll.

3. A packing or wiper comprising a contact member having two longitudinal edge portions for contact with a roll and a semi-circular depression on its under side, and fluid means to press said contact member into contact with the roll.

4. A packing or wiper comprising a contact member having two longitudinal edge portions for contact with a roll and a semi-circular depression on its under side, and fluid means to press said contact member into contact with the roll, and means to regulate the amount of fluid admitted to said fluid means.

5. The combination in a vacuum closure apparatus, a vacuum chamber, a plurality of sealing rolls in sliding engagement with the walls of said chamber, wiper members for contact with the surface of said rolls, slots in the frame of said vacuum closure, the said wiper members being mounted in said slots with their ends protruding from said slots, and fluid means to press said wiper members into contact with the rolls.

6. The combination in a vacuum closure, an opening in the frame of the closure, a wiper or packing mounted in said opening, means to close one end of the packing, means located at the other end of said packing to supply fluid thereto, and means to regulate the amount of fluid supplied to said packing.

7. The combination in a vacuum closure apparatus, a sealing roll, a ring having a bearing surface and detachably secured to the end of said roll, a ring detachably secured to the frame of said closure and having a surface for engagement with the surface of said roll ring.

8. The combination in a vacuum closure apparatus, a sealing roll, a ring having a bearing surface and detachably secured to the end of said roll, a ring mounted in the frame of said closure, and yielding means to press said ring into contact with said roll ring.

9. The combination in a vacuum closure apparatus, a sealing roll, a ring having a bearing surface and detachably secured to the end of said roll, a ring mounted in the frame of said closure and held in place by two rings each detachably secured to said frame, and yielding means to press said ring into engagement with said roll ring.

OGDEN MINTON.